(12) United States Patent
Stein et al.

(10) Patent No.: US 6,704,621 B1
(45) Date of Patent: Mar. 9, 2004

(54) SYSTEM AND METHOD FOR ESTIMATING EGO-MOTION OF A MOVING VEHICLE USING SUCCESSIVE IMAGES RECORDED ALONG THE VEHICLE'S PATH OF MOTION

(76) Inventors: Gideon P. Stein, 16 Shachar Road, Jerusalem 96263 (IL); Ofer Mano, 3 Nahal Sorek Road, Apt. 5, Modiin 71700 (IL)

( * ) Notice: Subject to any disclaimer, the term of this patent is extended or adjusted under 35 U.S.C. 154(b) by 0 days.

(21) Appl. No.: 09/723,754

(22) Filed: Nov. 26, 2000

Related U.S. Application Data

(60) Provisional application No. 60/230,166, filed on Sep. 1, 2000, and provisional application No. 60/167,587, filed on Nov. 26, 1999.

(51) Int. Cl.$^7$ .................................................. G06F 7/00
(52) U.S. Cl. ............................. 701/1; 701/28; 382/104
(58) Field of Search ............................... 701/1, 26, 28; 382/103, 104; 348/142, 148

(56) References Cited

U.S. PATENT DOCUMENTS 5,809,161 A * 9/1998 Auty et al. ................. 382/104
5,913,375 A * 6/1999 Nishikawa ................. 180/168
5,987,152 A * 11/1999 Weisser ...................... 382/104

FOREIGN PATENT DOCUMENTS

JP     20010347699 A  * 2/2001

* cited by examiner

*Primary Examiner*—Gertrude Arthur
(74) *Attorney, Agent, or Firm*—Richard A. Jordan

(57) ABSTRACT

An ego-motion determination system is disclosed for generating an estimate as to the ego-motion of a vehicle moving along a roadway. The ego-motion determination system includes an image information receiver and a processor. The image information receiver is configured to receive image information relating to a series of at least two images recorded as the vehicle moves along a roadway. The processor is configured to process the image information received by the image receiver to generate an ego-motion estimate of the vehicle, including the translation of the vehicle in the forward direction and the rotation of the vehicle around a vertical axis as between, for example, successive images.

36 Claims, 4 Drawing Sheets

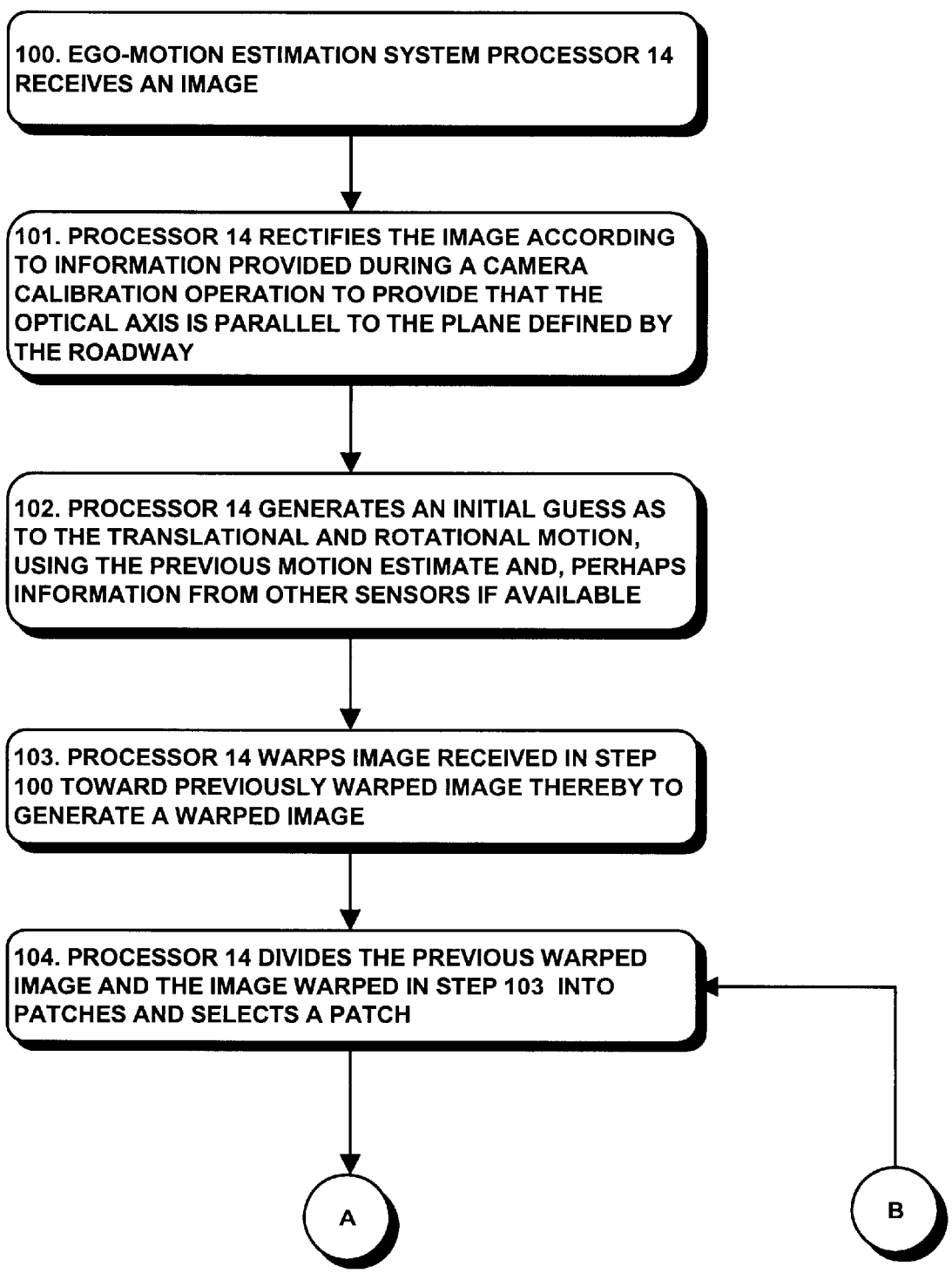

SYSTEM AND METHOD FOR ESTIMATING EGO-MOTION OF A MOVING VEHICLE USING SUCCESSIVE IMAGES RECORDED ALONG THE VEHICLE'S PATH OF MOTION

This application is a continuation in part of U.S. Provisional Patent Application Ser. No. 60/167,587, filed Nov. 26, 1999 and U.S. Provisional Patent Application Ser. No. 06/230,166, filed Sep. 1, 2000.

FIELD OF THE INVENTION

The invention relates generally to the field of systems and methods for estimating ego-motion (that is, "self-motion") of a moving vehicle, and more specifically to systems and methods that estimate ego-motion using successively-recorded images recorded along the vehicle's path of motion.

BACKGROUND OF THE INVENTION

Accurate estimation of the ego- ("self-") motion of a vehicle relative to a roadway is an important component in autonomous driving and computer vision-based driving assistance. Using computer vision techniques to provide assistance while driving, instead of mechanical sensors, allows for the use of the information that is recorded for use in estimating vehicle movement to also be used in detecting obstacles, identifying lanes and the like, without the need for calibration between sensors as would be necessary with mechanical sensors. This reduces cost and maintenance.

There are several problems in estimating ego-motion of a vehicle. Typically, roads have few feature points, if any. The most obvious features in a road, such as lane markings, have a generally linear structure, whereas background image structures, such as those associated with other vehicles, buildings, trees, and the like, will typically have many feature points. This will make image- or optical-flow-based estimation difficult in practice. In addition, typically images that are recorded for ego-motion estimation will contain a large amount of "outlier" information that is either not useful in estimating ego-motion, or that may result in poor estimation. For example, in estimating of ego-motion relative to a fixed structure such as a road, images of objects that are moving relative to the road, such as other moving vehicles and even moving wipers, will contribute false information for the ego-motion estimation. In addition, conditions that degrade image quality, such as raindrops and glare, will also make accurate ego-motion estimation difficult.

SUMMARY OF THE INVENTION

The invention provides a new and improved system and method for estimating ego-motion using successively-recorded images recorded along the vehicle's path of motion.

In brief summary, the invention provides an ego-motion determination system for generating an estimate as to the ego-motion of a vehicle moving along a roadway. The ego-motion determination system includes an image information receiver and a processor. The image information receiver is configured to receive image information relating to a series of at least two images recorded as the vehicle moves along a roadway. The processor is configured to process the image information received by the image receiver to generate an ego-motion estimate of the vehicle, including the translation of the vehicle in the forward direction and the rotation of the vehicle around a vertical axis as between, for example, successive images.

Several methodologies are disclosed for generating the ego-motion estimate of the vehicle.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 2–2A are charts depicting operations performed by the ego-motion estimation system in determining ego-motion of the vehicle in accordance with one methodology.

DETAILED DESCRIPTION OF AN ILLUSTRATIVE EMBODIMENT

Figure 1:
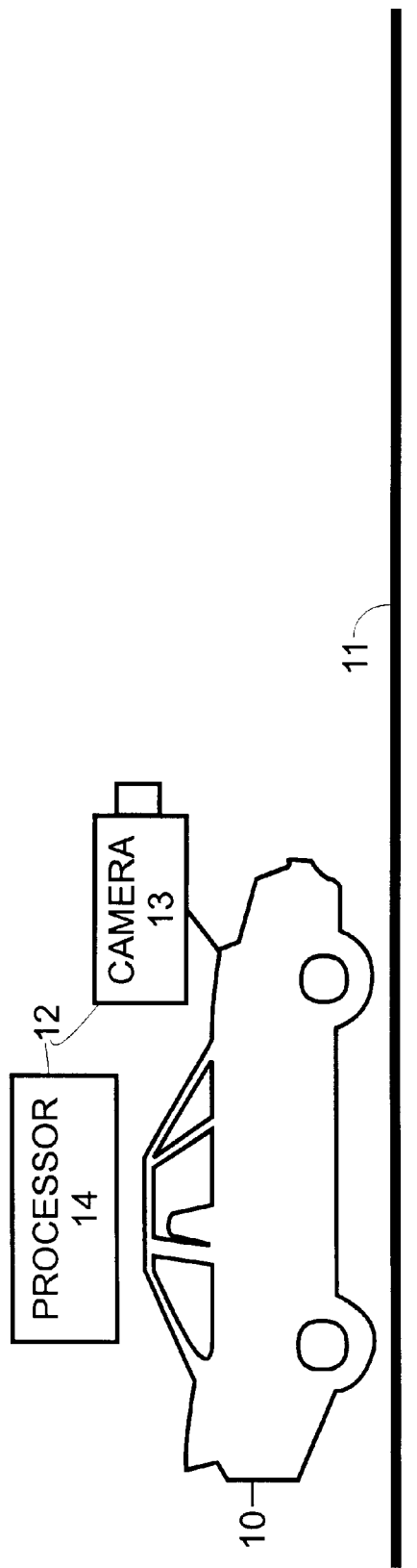
FIG. 1 schematically depicts a vehicle moving on a roadway and including an ego-motion estimation system constructed in accordance with the invention.

FIG. 1 schematically depicts a vehicle 10 moving on a roadway 11 and including an ego-motion estimation system 12 constructed in accordance with the invention. The vehicle 10 may be any kind of vehicle 10 that may move on the roadway 11, including, but not limited to automobiles, trucks, buses and the like. The ego-motion estimation system 12 includes a camera 13 and a ego-motion estimation system processor 14. The camera 13 is mounted on the vehicle 10 and is preferably pointed in a forward direction, that is, in the direction in which the vehicle would normally move, to record successive images as the vehicle moves over the roadway. Preferably as the camera 13 records each image, it will provide the image to the ego-motion estimation system processor 14. The ego-motion estimation system processor 14, in turn, will process information that it obtains from the successive images, possibly along with other information, such as information from the vehicle's speedometer (not separately shown) to determine the ego-motion (that is, the self-motion) of the vehicle relative to the roadway 11. The ego-motion estimation system processor 14 may also be mounted in or on the vehicle 11 and may form part thereof. The ego-motion estimates generated by the ego-motion estimation system processor 14 may be used for a number of things, including, but not limited to obstacle and lane detection, autonomous driving by the vehicle, perhaps also using positioning information from, for example, the global positioning system ("GPS") and roadway mapping information from a number of sources known to those skilled in the art, and the like. Operations performed by the ego-motion estimation system processor 14 in determining ego-motion of the vehicle 10 will be described in connection with the flow charts depicted in FIGS. 2 and 3.

Before proceeding further, it would be helpful to provide background of the operations performed by the ego-motion estimation system processor 14 depicted in FIG. 1. Generally, as between two images $\Psi$ and $\Psi'$ the ego-motion estimation system processor 14 attempts to determine the translation $T=(t_X,t_Y,t_Z)^T$ and rotation $w=(w_X,w_Y,w_Z)^T$ (where "T" refers to the transpose operation, $t_i$ refers to translation along the respective "X," "Y" and "Z" axes, and $w_i$ refers to rotation around the respective axis) of the camera 13 affixed to the vehicle 10. Since the camera 13 is affixed to the vehicle 10, the translation and rotation of the camera 13 will also conform to the translation and rotation of the vehicle 10. In that case, for a point $p=(x,y)^T$ (where "x" and "y" are coordinates of a point or feature in the image) that is a projection of a point $P=(X,Y,Z)^T$ (where "X," "Y" and "Z" are coordinates of the point in three-dimensional space), the flow vector for the point, that is, the vector indicating the motion of the same point in three dimensional space from is position in the image $\Psi$ to the image $\Psi'$, has components (u,v)

$$u = \frac{1}{Z}S_1^T t + (\hat{p}XS_1)^T w \qquad (1)$$

$$v = \frac{1}{Z}S_2^T t + (\hat{p}XS_2)^T w,$$

where "X" in equations (1) refers to the matrix cross-product and $$S_1 = \begin{pmatrix} f \\ 0 \\ -x \end{pmatrix} \; S_2 = \begin{pmatrix} 0 \\ f \\ -y \end{pmatrix} \; \hat{p} = \begin{pmatrix} x/f \\ y/f \\ 1 \end{pmatrix}, \qquad (2)$$

where "f" is the focal length of the camera 13, which is presumed to be known. The roadway on which the vehicle 10 is traveling is modeled as a plane. The equation for points on a plane is $$AX+BY+BZ=1 \qquad (3),$$

where the "X" and "Y" axes correspond to horizontal "x" and vertical "y" axes of the image plane, and the "Z" axis is perpendicular to the image plane. The camera 13 may be tilted slightly downwardly to increase the amount of the image that corresponds to the road, and reduce the amount of the image that corresponds to other features, such as other traffic, buildings, trees and the like, and in that case, the images $\Psi$ and $\Psi'$ will be rectified so that the images z axis will be parallel to the plane of the roadway, as will be described below.

Dividing equation (3) by "Z" provides $$1/Z = ax+by+c \qquad (4),$$

where a=A/f, b=B/f and c=C. Substituting equation (4) into equations (1) results in $$u=(ax+by+c)S_1^T t+(\hat{p}XS_1)^T w$$

$$v=(ax+by+c)S_2^T t+(\hat{p}XS_2)^T w \qquad (5)$$

Expanding equations (5) results in $$u = -(ct_z + aft_x)x + (bft_x - w_z) + \qquad (6)$$
$$(fw_y + cft_x) + \left(\frac{w_y}{f} - at_z\right)x^2 - \left(\frac{w_x}{f} + bt_z\right)xy$$

$$v = (w_z + aft_x)x + (-ct_z + bft_y)y - \qquad (7)$$
$$(fw_x + cft_y) + \left(\frac{w_y}{f} - at_z\right)xy - \left(\frac{w_x}{f} + bt_z\right)y^2.$$

Equations (6) and (7) are a special case (the "calibrated camera 13" case) of an eight parameter model for a camera 13 moving relative to a plane:

$$u=a_1x+a_2y+a_3+a_7x^2+a_8xy \qquad (8)$$

$$v=a_4x+a_5y+a_6+a_7xy+a_8y^2 \qquad (9)$$

Given the flow vector (u,v), one can recover the parameters $\alpha_i$, i=1, . . . ,8, from which one can recover the motion parameters t and w.

One problem arises in connection with the methodology described above in connection with equations (1) through (9), namely, given the large number of parameters $\alpha_i$ whose values need to be determined, it is difficult to devise a satisfactory method that will reject outliers. This follows from the fact that a relatively large number of optical flow vectors (u,v) will need to be used in determining the values of the parameters, which, in turn, requires a corresponding number of points in both images. In addition, it is difficult to differentiate between optical flow due to rotation around the X and Y axes and translation along the X and Z axes, respectively.

Accordingly, it is desirable to reduce the number of motion parameters to a minimum. The motion of a vehicle 10 along a roadway can be modeled as being constrained to be a translation along the Z axis, as the vehicle 10 moves forward or in reverse, and a rotation around the X and Y axes, as the vehicle 10's path deviates from a straight-line course. In that case, equation (5) reduces to $$u = (ax+by+c)xt_z - \frac{xy}{f}w_x + \left(f + \frac{x^2}{f}\right)w_y \qquad (10)$$

$$v = (ax+by+c)yt_z - \left(f + \frac{y^2}{f}\right)w_x + \frac{xy}{f}w_y.$$

If the images are rectified to ensure that the plane of the roadway is parallel to the camera 13's XZ plane, that is, so that the images would be as if the camera 13's optical axis is parallel to the plane of the road, then, in equations (10) a=0 and c=0, in which case $$u = bxyt_z - \frac{xy}{f}w_x + \left(f + \frac{x^2}{f}\right)w_y \qquad (11)$$

$$v = -by^2 t_z - \left(f + \frac{y^2}{f}\right)w_x + \frac{xy}{f}w_y.$$

In order to rectify the images, the camera 13 will need to be calibrated. A methodology for calibrating the camera 13 and rectifying the images will be described below.

In equations (11) there are three motion parameters, $t_Z$ (translation along the Z axis), $w_X$ (rotation around the X axis) and $w_Y$ (rotation around the Y axis) to be determined from the flow vectors (u,v) associated with points in at least some portions of the images $\Psi$ and $\Psi'$. Finding corresponding points in the images $\Psi$ and $\Psi'$, that is, points that are projections of the same point in three-dimensional space in the respective images is based on a "photometric constraint"

$$I(x,y,t)-I(x+u\delta t, y+v\delta t, t+\delta t)=0 \qquad (12),$$

which essentially states that the irradiance, or luminance, of the point $p=(x,y)^T$ in the image $\Psi$ and and the point $p=(x+u\delta t, y+v\delta t)$ in the image $\Psi'$, which are projections of the same point in three-dimensional space into the respective images, are the same. In practice, equation (12) will not hold exactly because of noise. If, for every point, the noise is modeled as zero mean Gaussian noise, equation 12 reduces to $$P(I(x,y,t)-I(x+u\delta t, y+v\delta t, t+\delta t))=N(\sigma^2, 0) \qquad (13)$$

and a maximum likelihood can be sought.

Equation (13) can be computationally intensive, and, instead of using that equation, the motion parameters $t_Z$, $w_X$ and $w_Y$ can be determined directly from the images by combining the geometric constraints embodied in equation (11) with the photometric constraints embodied in equation (12). In that operation, given two consecutive images $\Psi$ and $\Psi'$, the goal is to determine the probability $$P(\hat{m}|\Psi,\Psi') \qquad (14).$$

of that the motion of the vehicle 10 is $\hat{m}=(t_z,w_x,w_y)$ given the two images. The motion $\hat{m}$ that maximizes (14) is the estimate of the camera 13 motion between the two images $\Psi$ and $\Psi'$, and, thus, the estimate of vehicle 10 motion between the two images.

According to Bayes' rule, $$P(\hat{m}|\Psi,\Psi') = \frac{P(\Psi'|\Psi,\hat{m})P(\hat{m})}{P(\Psi')}, \qquad (15)$$

where $P(\Psi'|\Psi,\hat{m})$ is the probability that, given image $\Psi$, motion $\hat{m}$ will result in image $\Psi'$, $P(\hat{m})$ is the a priori probability that the motion is $\hat{m}$, and $P(\Psi')$ is the a priori probability that the image is $\Psi'$. It will be assumed that $P(\hat{m})$, the probability that the motion is $\hat{m}$, is uniform in a small region $\hat{M}$ around the previous motion estimate, that is, the motion estimate generated as between the "i-1st" and "i-th" images; it will be appreciated that, if the time period between the times at which images $\Psi$ and $\Psi'$ are recorded is sufficiently small, this assumption will hold. It will further be appreciated that, in equation (15), the denominator $P(\Psi')$ does not depend on the motion $\hat{m}$, and so it does not affect the search for a maximum.

The probability that, given image $\Psi$, motion $\hat{m}$ will result in image $\Psi$, $P(\Psi'|\Psi,\hat{m})$, can be determined by warping the image $\Psi'$ according to the motion $\hat{m}$, thereby to generate a warped image $\hat{\Psi}'$ and determining the sum squared difference ("SSD")

$$S(\hat{m}) = \frac{1}{N} \sum_{x,y \in R} \left(\hat{\Psi}'(x,y) - \Psi(x,y)\right)^2, \qquad (16)$$

between corresponding patches, or regions, R in the images that are believed to be a projection of the roadway in the two images. In equation 16, "N" is the number of points in the region R. It will be appreciated that, if the images $\Psi$ and $\Psi'$ are recorded at times "t" and "t+$\delta$t", respectively, the warped image $\hat{\Psi}'$ will represent the image that is assumed would be recorded at time "t" if the motion is $\hat{m}$. Using the SSD criteria (equation 16), $P(\Psi'|\Psi,\hat{m})$, the probability that image $\Psi'$ would result from image $\Psi$ and a motion $\hat{m}$ is given by the probability density function $$P(\Psi'|\Psi,\hat{m}) = ce^{-\frac{S(\hat{m})}{\sigma^2}}, \qquad (17)$$

where "c" is a normalization factor and "$\sigma$" is the variance of the noise, which is modeled as a zero mean Gaussian function. Since it is assumed that $P(\hat{m})$, the probability that the motion is $\hat{m}$, is uniform in a small region $\hat{M}$ around a previous motion estimate, the problem of finding the maximum likelihood motion $\hat{m}$ for a patch of image $\Psi$ reduces to finding the maximum of the probability density function $$P(\hat{m}|\Psi,\Psi') = ce^{-\frac{S(\hat{m})}{\sigma^2}}, \qquad (18)$$

for motion $\hat{m} \in \hat{M}$.

Since the motion for which the ego-motion estimation system processor 14 is to generate an estimate is the translational and rotational motion of the vehicle 10 relative to the road, it is desirable for the ego-motion estimation system processor 14 to consider only regions of the images T and T' that comprise projections of the road, and ignore other regions of the images. However, it should be noted that the set R of regions, or patches, of the images that projections of the roadway in the two images $\Psi$ and $\Psi'$, is not known. To accommodate that, instead of attempting to maximize the function defined in equation (18), the image can be tessellated into a set of patches $W_i$, and a probability density $P(\hat{m}|W_i,W_i')$ generated for each patch using equations (16) and (18) for the respective patches. The probability density over the entire pair of images $\Psi$ and $\Psi'$ will be $$P(\hat{m}|\Psi,\Psi') = c \sum_i \frac{P(\hat{m}|W_i,W_i')\lambda_i \alpha_i \beta_i}{\sum_i \lambda_i}, \qquad (19)$$

where $\lambda_i$ and $\alpha_i$ are weighting functions whose values generally reflect the confidence that the "i-th" patch is a projection of the road. The value of the gradient strength $\beta_i$ for a patch reflects the degree to which the patch the contains a texture, and thus will more likely to contain useful information for use in determining ego motion of the vehicle. The motion $\hat{m} \in \hat{M}$ for which equation (19) is the maximum will be deemed to correspond to the actual translational and rotational motion of the vehicle 10 as between the locations at which images $\Psi$ and $\Psi'$ were recorded.

The weighting function $\lambda_i$ for the respective "i-th" patch is generated using patches $W_i$ and $w'_i$ from respective images $\Psi$ and $\Psi'$. In determining the values for the weighting functions $\lambda_i$, for patches $W_i$, $W'_i$ that are not of the road, the motion model reflected in equation (11) is not a good fit; instead, a better fit can be obtained using some other motion of the patch. In addition, for planar image artifacts moving on the roadway surface, such as moving shadows, the maximum of equation (18) will occur far away from the initial guess. Accordingly, the value of the weighting function $\lambda_i$ for the "i-th" patch $W_i$, $W_i'$ will correspond to the ratio between the best fit using the motion model in a local region ($\hat{M}$) near the initial guess and the best fit using any motion model over large search region "L." Accordingly, if $$P_1 = \max\left(\exp\left(-\frac{S_i(\hat{m})}{\sigma^2}\right)\right) \qquad (20)$$

for all $\hat{m} \in \hat{M}$ is the value for the best fit in a local search region, where $S_i()$ denotes the SSD over all points in the "i-th" patch, and $$P_2 = \max\left(\exp\left(-\frac{S_i(\hat{m})}{\sigma^2}\right)\right) \qquad (21)$$

for all $\hat{m} \in L$ the value for the best fit over all possible image motions, then $$\lambda_i = \frac{P_1}{P_2}. \qquad (22)$$

Generally, generating the value for $P_2$ (equation 21) can be computationally intensive. To avoid generating $P_2$ according to equation (21), the value for $P_2$ for each patch can be estimated by using the SSD as between a patch in the image $\Psi$ and the correspondingly-positioned patch in the image $\Psi'$, as well as the SSD's as between the patch in the image $\Psi$ and patches translated horizontally and vertically around the correspondingly-positioned patch in the image $\Psi'$, for a selected number of points. That is, if the patch in image $\Psi$ consists of points p(x,y) centered on p(a,b) (that is, points p(a−α, b−β) through p(a+α,b+β) (α and β being integers), with the patch being of dimensions 2α+1 by 2β+1), $P_2$ is generated by using the SSD as between the patch of the same size in image $\Psi'$ consisting of points p(x,y) centered on p(a,b), as well as SSD's as between the patch in image $\Psi$ and patches of the same size in image $\Psi'$ that are centered on points p(a−δ, b−δ) through p(a+δ, b+δ), a total of $(2δ+1)^2$ patches in image $\Psi'$. Each patch in image $\Psi'$ can be considered as one of the possible image motions. In one embodiment, δ is selected to be seven, in which case there will be two hundred and twenty five patches in $\Psi'$ for which the SSD will be generated in generating the value for $P_2$.

Unlike weighting function $\lambda_i$, weighting function $\alpha_i$ for the respective "i-th" patch is generated using only patch $W_i$ and $W'_i$ from image $\Psi'$. Generally, it should be appreciated that, in three-dimensional space, there are three dominant directions for lines, namely, (i) vertical, for buildings, automobiles, and other objects that extend above the roadway surface, (ii) horizontal lines that are generally parallel to the direction of the roadway, and (iii) horizontal lines that are generally perpendicular to the direction of the roadway. In an image $\Psi'$, vertical lines (that is, lines of type (i)) and horizontal lines that are generally perpendicular to the direction of the roadway (that is, lines of type (iii)) will project in to image $\Psi'$ as vertical and horizontal lines, respectively. On the other hand, horizontal lines that are generally parallel to the direction of the roadway (that is, lines of type (ii)) will appear in image $\Psi'$ as lines that pass through a common point, that is, a vanishing point. It will be appreciated that patches $W'_i$ in image $\Psi'$ that are projections of the roadway will predominately contain lines of type (ii) and (iii). On the other hand, patches W' that are projections of obstacles, such as automobiles will predominately contain lines of type (i) and (iii), while patches W' that are projections of, for example, buildings, fences, and the like, will contain lines of type (i) and (ii).

Accordingly, the value for weighting function $\alpha_i$ for patch $W_i$ will reflect the degree to which it is deemed to contain projections of lines of type (ii) and (iii), and not projections of lines of types (i) and (iii) or types (i) and (ii). Generally, the directions of lines, if any, passing though a patch can be determined in relation to the gradients of the luminance at the various points in the patch $W_i$. Each point in the patch $W'_i$ whose gradient $(I_x,I_y)$ is above a selected threshold is considered to lie at or near a line, with the direction of the line being perpendicular to the direction of the gradient. Thus, for those points, the direction of the line associated therewith can be determined, as can whether the line is of type (i), (ii) or (iii). Thus, for each patch $W'_i$ in the image $\Psi'$, three sums $S^n_i$ (n=i, ii or iii) are generated each corresponding to the sum of the magnitudes of the gradients of the points in the patch that are associated with lines of the respective type, the magnitude corresponding to $G=(I_x^2+I_y^2)^{0.5}$. A patch $W'_i$ in image $\Psi'$ is deemed to be:

(a) a projection of the roadway if the sums $S^{ii}_i$ and $S^{iii}_i$ are both large and significantly larger than sum $S^i_i$, since the sums indicate that the patch is associated with a line or lines that are horizontal and in the direction of the roadway and/or perpendicular thereto, but not a line or lines that are vertical;

(b) be a projection of an obstacle, that is, an object generally in the path of the vehicle, if sums $S^i_i$ and $S^{iii}_i$ are both large and significantly larger than sum $S^{ii}_i$, since the sums indicate that the patch is associated with a line or lines that are vertical and/or horizontal and perpendicular to the direction of the roadway, but not a line or lines that are horizontal and in the direction of the roadway; and (c) a projection of an object to the side of the path of the vehicle if sums $S^i_i$ and $S^{ii}_i$ are both large and significantly larger than sum $S^{iii}_i$, since the sums indicate that the patch is associated with a line or lines that are vertical and/or horizontal and in the direction of the roadway.

The value of the weighting function $a_i$ is assigned to the patch based on the degree to which the patch $W_i$ is deemed to be a projection of the roadway (case (a) above).

It will be appreciated that, if, for a patch $W'_i$, the sum $S^{ii}_i$ is relatively large, indicating that the patch is associated with a line that is horizontal and in the direction of the roadway, but sums $S^i_i$ and $S^{iii}_i$ are relatively small, indicating that the patch is not associated with a line that is vertical or horizontal and perpendicular to the direction of the roadway, it generally cannot be determined from the set of sums generated for the patch whether the patch is a projection of the roadway (case (a) above) or a projection of an object to the side of the path of the vehicle (case (c) above). However, since the patch is not associated with a line that is vertical, it will generally not be deemed to be a projection of an obstacle (case (b) above). In that case, an assessment as to whether the patch is a projection of the roadway (case (a) above) or a projection of an object to the side of the path of the vehicle (case (c) above) by referring to patches adjacent thereto.

As noted above, the value of the gradient strength $\beta_i$ for a patch reflects the degree to which the patch the contains a texture, and thus will more likely to contain useful information for use in determining ego motion of the vehicle. The gradient strength $\beta_i$ corresponds to $$\beta_i = \left( \sum_{\hat{m} \in L} \exp\left(-\frac{S_i(\hat{m})}{\sigma^2}\right) \right)^{-1}. \tag{23}$$

For relatively uniform patches, the value of the SSD $S_i(\hat{m})$ will be relatively low for all motions, in which case the value of $\beta_i$ will be relatively low. On the other hand, for patches with texture, the value of the SSD will be relatively high for most motions, in which case the value of $\beta_{i-}$ will be relatively high.

Figure 2A:
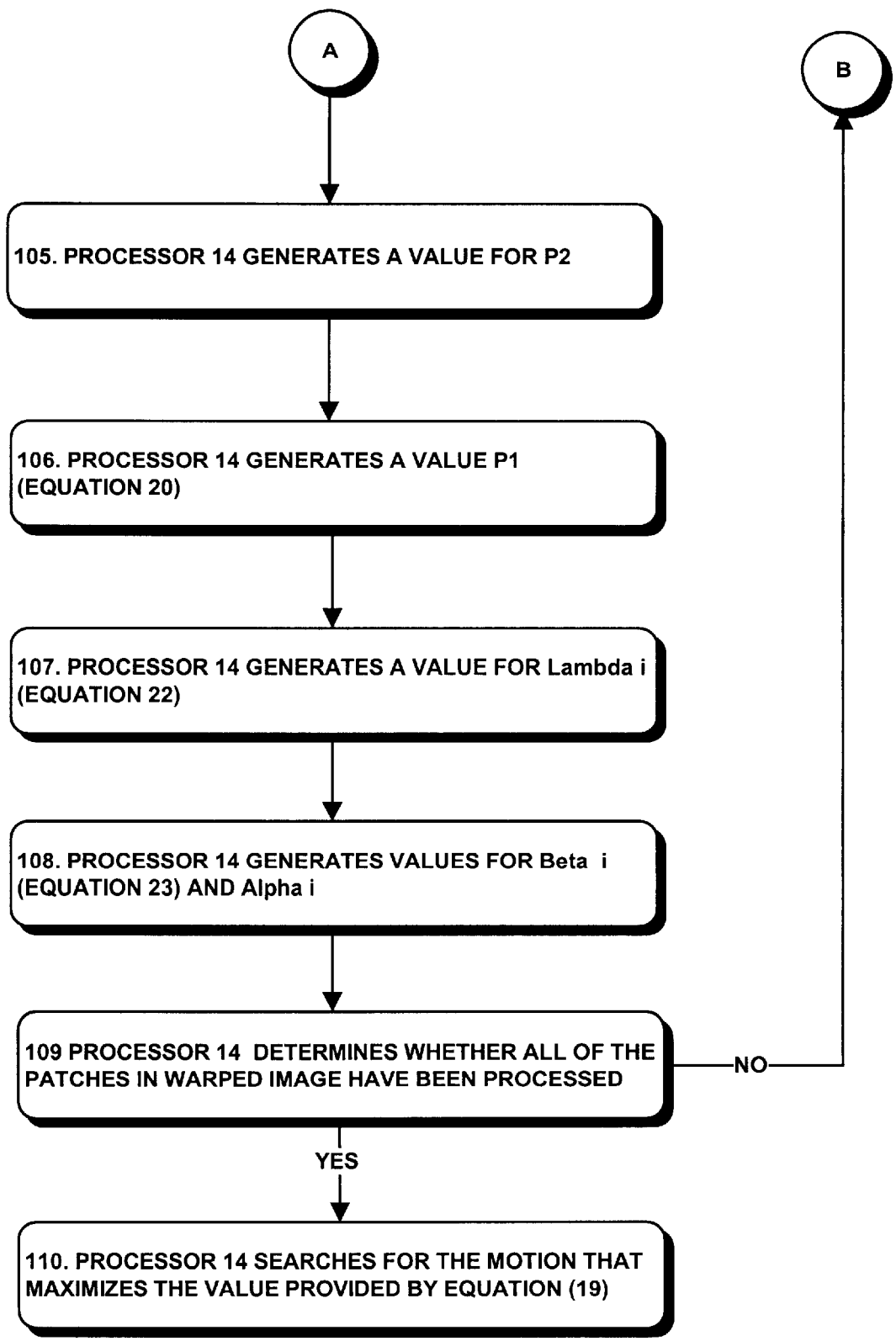

With this background, operations performed by the ego-motion estimation system processor 14 will be describe in connection with the flow chart depicted in FIG. 2. In connection with FIG. 2, it is assumed that the ego-motion estimation system processor 14 already has image $\Psi$, which it may have used in connection with determining the translational and rotational motion up to the location at which image $\Psi$ was recorded. With reference to FIG. 2, after the ego-motion estimation system processor 14 has received image $\Psi'$ (step 100), it will rectify the image according to information provided during the camera 13 calibration operation (described below) to provide that the optical axis is parallel to the plane defined by the roadway (step 101). In addition, the ego-motion estimation system processor 14 will generate an initial guess as to the translational and rotational motion, using the previous motion estimate and, perhaps information from other sensors if available (step 102). For example, the ego-motion estimation system processor 14 may make use of information from the vehicle 10's speedometer, as well as information as to the time period between the time at which image $\Psi$ was recorded and the time at which image Ψ' was recorded, in generating the initial guess. Generally, it will be appreciated that the time period will be fixed, and will preferably the same for each successive pair of images Ψ and Ψ'. After the ego-motion estimation system processor 14 has generated the initial guess, it will use the initial guess to warp image Ψ' toward image Ψ, thereby to generate a warped image Ψ̂' (step 103).

After the ego-motion estimation system processor 14 has generated the warped image (step 103), it will divide the image Ψ and the warped image Ψ̂' into patches and, for each pair of corresponding patches in the two images Ψ and Ψ̂', generate the weighting value $\lambda_i$. In that operation, the ego-motion estimation system processor 14 will select a patch in the image Ψ (step 104) and generate values for $P_2$ (step 105), $P_1$ (equation 20) (step 106) and $\lambda_i$ (equation 22) (step 107) as described above. In addition, the ego-motion estimation system processor 14 can generate the value for $\beta_i$ (equation 23) and $\alpha_i$ (step 108). After the ego-motion estimation system processor 14 has generated performed steps 105 through 108 for the selected patch, it will determine whether all of the patches in image Ψ have been processed (step 109) and if not, return to step 104 to select another patch and perform steps 105 through 109 in connection therewith.

The ego-motion estimation system processor 14 will perform steps 104 through 109 in connection with each patch in the image Ψ. After the ego-motion estimation system processor 14 has performed steps 104 through 109 in connection with all of the patches in the image Ψ, it will sequence from step 109 to step 110 to search for the motion m that maximizes the value provided by equation (19) (step 110). That motion m̂ will comprise values for translation $t_Z$ and rotation $w_X$, $w_Y$ parameters that will constitute the estimate of the motion of the vehicle 10 as between the point in time at which image Ψ was recorded and the point in time at which image Ψ' is recorded. The ego-motion estimation system processor 14 can perform operations described above in connection with each successive pair of images Ψ and Ψ' to estimate the motion of the vehicle 10.

In performing steps 106 (to generate the values for $P_i$) and 110 (to determine the motion m̂ that maximizes the value provided by equation (19)), the ego-motion estimation system processor 14 can perform a gradient descent that is limited to a selected cube-shaped region around the initial guess.

In determining the initial guess (step 102) for each new image Ψ', the ego-motion estimation system processor 14 can use the estimate of the motion generated for the previously-received image.

In addition, the size of the region M̂ can be adjusted adaptively.

Figure 3:
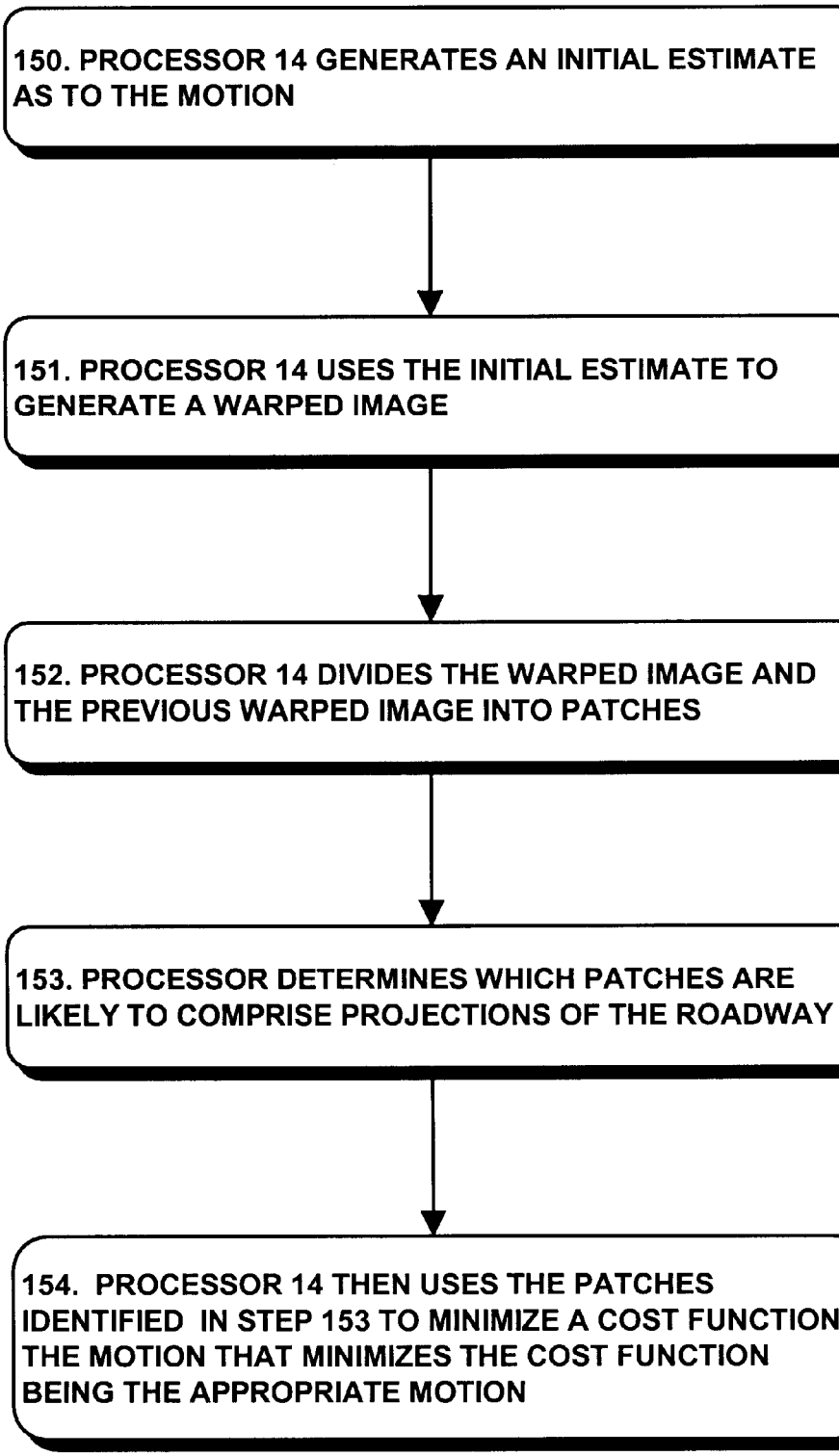
FIG. 3 is a flow chart depicting operations performed by the ego-motion estimation system in determining ego-motion of the vehicle in accordance with a second methodology.

A second methodology for determining the ego-motion of a vehicle 10 will be described in connection with FIG. 3. As with the methodology described above in connection with FIG. 2, it is assumed that the images have been rectified so that the image planes are perpendicular to the plane represented by the roadway on which the vehicle 10 is traveling, and their horizontal ("x") axes are parallel to the plane represented by the roadway. By way of background, in that case, the equation of a plane $$AX+BY+CZ=1 \tag{24}$$

(reference equation (3)) reduces to $$BY=1 \tag{25},$$

in which case $$Y = \frac{1}{|B|}$$

is the height of the optical axis of the camera 13 (or, more specifically, the Z axis) above the road. Since, for a point p(x,y) in an image that is a projection of a point P(X,Y,Z) in three-dimensional space, $$y = f\frac{Y}{Z},$$

equation (25) becomes $$\frac{1}{Z} = by \tag{26}$$

The brightness constraint is $$uI_x + vI_y = I_t = 0 \tag{27}$$

for each point, where, at each point (x,y) in the image, $I_x$ and $I_y$ are the horizontal and vertical components of the spatial gradient of the luminance and $I_t$ is the time gradient of the luminance. In addition, the equations for the components (u,v) of the flow vector (reference equation (1)) can be written $$u = \frac{1}{Z}S_1^T t + S_1^T [w]_X p \tag{28}$$

$$v = \frac{1}{Z}S_2^T t + S_2^T [w]_X p$$

where $[w]_x$ is a skew-symmetric matrix, in which case $$\frac{1}{Z}S^T t + S^T [w]_X p + I_t = 0, \tag{29}$$

where $$S = \begin{pmatrix} fI_x \\ fI_y \\ -xI_x - yI_y \end{pmatrix}. \tag{30}$$

For motion constrained to a plane, equation (29) reduces to $$(ax+by+c)S^T t + S^T [w]_X p + I_t = 0 \tag{31}.$$

Since the images are rectified, equation (26) will hold. In addition, since rotational motion is constrained so as to occur only around the vertical ("Y") axis, $w_X = w_Z = 0$. Accordingly, equation (31) will correspond to $$byS^T t + S^T \begin{pmatrix} 0 & 0 & -w_Y \\ 0 & 0 & 0 \\ -w_Y & 0 & 0 \end{pmatrix} \begin{pmatrix} x/f \\ y/f \\ 1 \end{pmatrix} + I_t = 0. \tag{32}$$

Expanding equation 32, and using equation (30), $$byS^T t - (fI_x + xI_x + yI_y)w_Y + I_t = 0 \tag{33}$$

Generally, the portion $u_{w_Y}$ of the vertical component of the flow vector that arises due to rotation ($w_Y$) of the vehicle 10 will be larger than the portion $u_{tX}$ that arises due to translation ($t_X$) along the "X" axis, and the portions will have a very different form. The portion $t_X$ that arises due to translation along the "X" axis will depend on the distance that the vehicle 10 moves between the times the images are recorded, and will be larger for points towards the bottom of the image than for points further up. In that case, expressions for $u_{wY}$ and $u_{tX}$ are $$u_{wY} = \left(\frac{x^2}{f} + f\right) w_Y \approx f w_Y \tag{34}$$

$$u_{tX} = \frac{1}{Z} f t_X = by f t_X \tag{35}$$

Since, for small rotations around the vertical "Y," axis, the angle of rotation $w_Y$ is approximately $$w_Y \approx \frac{t_X}{t_Z}, \tag{36}$$

$$\frac{u_{wY}}{u_{tX}} = \frac{f \frac{t_X}{t_Z}}{\frac{1}{Z} f t_X} = \frac{Z}{t_Z} \tag{37}$$

It will be appreciated that values for $t_Y$, the component of the translation t in the vertical direction, and $w_X$ and $w_Z$, the X and Z components of rotation w, will be zero. Accordingly, after the ego-motion estimation system processor 14 receives a new image $\Psi'$, it will determine the values for $t_1$ and $t_3$, the components of the translation t in the forward (along the Z axis) and side (along the X axis) directions, and $w_Y$, the component of rotation around the vertical (Y) axis. In that operation, the ego-motion estimation system processor 14 will generate an initial estimate as to the motion (step 150, FIG. 3) and use that initial estimate to generate a warped image $\hat{\Psi}'$ (step 151). The ego-motion estimation system processor 14 can use information from a number of sources in connection with generating the initial estimate (step 150), including information from, for example, the vehicle 10's speedometer. Thereafter, the ego-motion estimation system processor 14 divides the image $\Psi$ and $\hat{\Psi}'$ into patches (step 152) and determines which patches are likely to comprise images of the roadway (step 153). In determining which patches are likely to comprise images of the roadway (reference step 153), the ego-motion estimation system processor 14 can generate an SSD (equation 16) for corresponding patches in the images $\Psi$ and $\hat{\Psi}'$ and determine that patches in the warped image $\hat{\Psi}'$ that comprise images of the roadway will be those patches with a relatively high SSD value. The ego-motion estimation system processor 14 then uses the patches identified in step 153 to minimize a cost function of the form $$\min_t \sum_{x,y \in R} |At - b|^2 + \lambda_1 \sum_i \left|W_1\left(\frac{dt_i}{dT}\right)\right|^p + \lambda_2 |W_2(t - t_0)|^p, \tag{38}$$

where $W_1$ and $W_2$ are weighting matrices that essentially describe confidence in the priors or smoothness values (step 154). Equation (38) can be formalized in the form of a Kalman filter, and the value of "p" can be selected to be one or two depending on whether the $L_1$ or $L_2$ norm is to be used.

As noted above, for methodologies described above in connection with both FIGS. 2 and 3, the ego-motion estimation system processor 14 will initially rectify the images as received from the camera 13. In the above description, the images I and I' are images as rectified by the ego-motion estimation system processor 14. To rectify the images as received from the camera 13, the camera 13 will need to be calibrated during a calibration operation prior to use in connection with recording images for use in estimating vehicle 10 motion as described above. Before describing operations to be performed during calibration, it would be helpful to consider the effects of incorrect calibration. If, for example, a vehicle is driving along a straight road, and if the optical axis of the camera is aligned with the direction of motion, the flow field of successively recorded images will be an expansion field with the focus of expansion located at the center of the respective images, that is, at the origin (x,y)=(0,0) of the image's rectilinear coordinate system. On the other hand, if the camera is mounted on the vehicle with a small rotation around the vertical ("Y") axis in three-dimensional space, then the focus of expansion will be displaced along the image's horizontal ("x") axis. In that case, the motion model defined by equation (11) will not account for the flow field, but will be well approximated by a forward translation and a rotational velocity $w_y$ around the vertical ("Y") axis.

Accordingly, errors in the orientation of the camera around the vertical ("Y") axis in three dimensional space will create a bias in the rotation estimate, in which case a curved path would be estimated instead of a straight path. Similarly, errors in the camera's orientation around the horizontal ("X") axis in three dimensional space will cause a bias in the pitch estimate. Based on these observations, a calibration operation can be performed by having the camera record a sequence of images while the vehicle is being driven down a straight roadway. The vehicle's ego-motion is estimated as described above in connection with FIG. 2 or 3, and calibration parameters are estimated that would cause the ego-motion to integrate into a straight path.

The invention provides a number of advantages. In particular, the invention provides an arrangement for determining ego-motion of a vehicle 10 on a roadway from a series of images recorded by a camera 13 mounted on the vehicle 10, at least a portion of the images comprising projections of the roadway, and without requiring mechanical sensors which are normally not provided with a vehicle 10 and that would, if provided, increase the cost and maintenance expenses thereof.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. An ego-motion determination system for generating an estimate as to the ego-motion of a vehicle moving along a roadway comprising:
   A. an image receiver configured to receive image information relating to a series of at least two images recorded as the vehicle moves along a roadway; and
   B. a processor configured to process the image information received by the image receiver to generate an ego-motion estimate of the vehicle relative to the roadway.

2. An ego-motion determination system as defined in claim 1 in which the processor is configured to generate the ego-motion estimate in relation to the likelihood that at least one difference between an image $\Psi'$ and a previously-recorded image $\Psi$ was due to a motion $\hat{m}$ as between the two images.

3. An ego-motion determination system as defined in claim 2 in which the processor is configured to generate the ego-motion estimate in relation to portions of the respective images $\Psi'$ and $\Psi$ that are likely to represent projections of the roadway.

4. An ego-motion determination system as defined in claim 3 in which the processor comprises:
   A. a patch generator configured to divide respective images $\Psi'$ and $\Psi$ into a plurality of respective patches $W_i'$ and $W_i$;
   B. a confidence value generator configured to generate for respective patches $W_i'$ and $W_i$ at least one confidence value representative of the confidence that the respective patch represents a projection of the roadway;
   C. a search generator configured to perform a search operation to identify the motion $\hat{m}$ that has a selected relationship in connection with a probability density function in relation to motions for the respective patches and the at least one confidence value.

5. An ego-motion determination system as defined in claim 4 in which the search generator is configured to perform the search operation to determine the motion $\hat{m}$ that maximizes the probability density function in relation to the respective patches.

6. An ego-motion determination system as defined in claim 5 in which the search generator is configured to perform the search operation to determine the motion $\hat{m}$ that maximizes the probability density function defined by $$P(\hat{m} | \Psi, \Psi') = c \frac{\sum_i P(\hat{m} | W_i, W_i') \lambda_i \alpha_i \beta_i}{\sum_i \lambda_i},$$

where (i) $P(\hat{m} | W_i, W_i') = c e^{\frac{S(\hat{m})}{\sigma^2}}$ represents a probability density function relating the respective "i-th" patches $W_i$ and $W_i'$, where $S(\hat{m})$ represents the sum of squared difference between the patch $W_i$ and the corresponding patch $W_i'$ warped according to the motion $\hat{m}$, and $\sigma$ is a function of noise in the respective images, and "c" is a normalization factor;

(ii) $\lambda_i$ and $\alpha_i$ are weighting functions whose values reflect the confidence that the respective "i-th" patch is a projection of the roadway; and (iii) $\beta_i$ is a gradient strength function whose value reflects the degree to which the image in the respective "i-th" patch contains a texture.

7. An ego-motion determination system as defined in claim 6 in which the search generator is configured to generate the sum of squared difference $S(\hat{m})$ for the respective "i-th" patches in accordance with $$S(\hat{m}) = \frac{1}{N} \sum_{x,y \in R} (\Psi'(x, y) - \Psi(x, y))^2,$$

where "R" represents the region associated with the respective "i-th" patch, and $\hat{\Psi}'$ represents the region of the respective image $\Psi'$ warped in accordance with the motion $\hat{m}$.

8. An ego-motion determination system as defined in claim 6 in which the search generator is configured to generate at least one value for the weighting function $\lambda_i$ in accordance with $$\lambda_i = \frac{P_1}{P_2},$$

where $$P_1 = \max \left( \exp \left( -\frac{S_i(\hat{m})}{\sigma^2} \right) \right)$$

for all $\hat{m} \in \hat{M}$ is the value for the best fit in a local search region, and $$P_2 = \max \left( \exp \left( -\frac{S_i(\hat{m})}{\sigma^2} \right) \right),$$

for all $\hat{m} \in L$ is the value for the best fit over all possible image motions.

9. An ego-motion determination system as defined in claim 6 in which the search generator is configured to generate at least one value for the weighting function $\alpha_i$ to reflect the degree to which projections of a line in the respective patch $W_i$, $W_i'$ is horizontal and parallel to the direction of the roadway or horizontal and perpendicular to the direction of the roadway, and not vertical.

10. An ego-motion determination system as defined in claim 9 in which the search generator is configured to generate at least one value for the weighting function $\alpha_i$ in relation to a gradient in luminance at respective points in the respective patch $W_i$, $W_i'$.

11. An ego-motion determination system as defined in claim 6 in which the search generator is configured to generate at least one value for the gradient strength function $\beta_i$ in accordance with $$\beta_i = \left( \sum_{\hat{m} \in L} \exp \left( -\frac{S_i(\hat{m})}{\sigma^2} \right) \right)^{-1} \tag{5}$$

where $S(\hat{m})$ represents the sum of squared difference between the patch $W_i$ and the corresponding patch $W_i'$ warped according to the motion $\hat{m}$, and $\sigma$ is a function of noise in the respective images.

12. An ego-motion determination system as defined in claim 11 in which the search generator is configured to generate the sum of squared difference $S(\hat{m})$ for the respective "i-th" patches in accordance with $$S(\hat{m}) = \frac{1}{N} \sum_{x,y \in R} (\hat{\Psi}'(x, y) - \Psi(x, y))^2,$$

where "R" represents the region associated with the respective "i-th" patch, and $\hat{\Psi}'$ represents the region of the respective image $\Psi'$ warped in accordance with the motion $\hat{m}$.

13. An ego-motion determination method for generating an estimate as to the ego-motion of a vehicle moving along a roadway comprising the steps of:
   A. an image information receiving step comprising the step of receiving image information relating to a series of at least two images recorded as the vehicle moves along a roadway; and
   B. an image information processing step comprising the step of processing the image information received by the image receiver to generate an ego-motion estimate of the vehicle relative to the roadway.

14. An ego-motion determination method as defined in claim 13 in which the processing step includes the step of generating the ego-motion estimate in relation to the likelihood that at least one difference between an image $\Psi'$ and a previously-recorded image $\Psi$ was due to a motion $\hat{m}$ as between the two images.

15. An ego-motion determination method as defined in claim 14 in which the processing step includes the step of generating the ego-motion estimate in relation to portions of the respective images $\Psi'$ and $\Psi$ that are likely to represent projections of the roadway.

16. An ego-motion determination method as defined in claim 15 in which the processing step includes:
   A. a patch generation step of dividing respective images $\Psi'$ and $\Psi$ into a plurality of respective patches $W_i'$ and $W_i$;
   B. a confidence value generation step of generating for respective patches $W_i'$ and $W_i$ at least one confidence value representative of the confidence that the respective patch represents a projection of the roadway;
   C. a search generation step of performing a search operation to identify the motion $\hat{m}$ that has a selected relationship in connection with a probability density function in relation to motions for the respective patches and the at least one confidence value.

17. An ego-motion determination method as defined in claim 16 in which the search generation step includes the step of performing the search operation to determine the motion $\hat{m}$ that maximizes the probability density function in relation to the respective patches.

18. An ego-motion determination method as defined in claim 17 in which the search generation step includes the step of performing the search operation to determine the motion $\hat{m}$ that maximizes the probability density function defined by $$P(\hat{m} \mid \Psi, \Psi') = c \frac{\sum_i P(\hat{m} \mid W_i, W_i') \lambda_i \alpha_i \beta_i}{\sum_i \lambda_i},$$

where (i) $P(\hat{m} \mid W_i, W_i') = c e^{\frac{S(\hat{m})}{\sigma^2}}$ represents a probability density function relating the respective "i-th" patches $W_i$ and $W_i'$, where $S(\hat{m})$ represents the sum of squared difference between the patch $W_i$ and the corresponding patch $W_i'$ warped according to the motion $\hat{m}$, and $\sigma$ is a function of noise in the respective images, and "c" is a normalization factor;

(ii) $\lambda_i$ and $\alpha_i$ are weighting functions whose values reflect the confidence that the respective "i-th" patch is a projection of the roadway; and (iii) $\beta_i$ is a gradient strength function whose value reflects the degree to which the image in the respective "i-th" patch contains a texture.

19. An ego-motion determination method as defined in claim 18 in which the search generation step includes the step of generating the sum of squared difference $S(\hat{m})$ for the respective "i-th" patches in accordance with $$S(\hat{m}) = \frac{1}{N} \sum_{x,y \in R} (\hat{\Psi}'(x, y) - \Psi(x, y))^2,$$

where "R" represents the region associated with the respective "i-th" patch, and $\hat{\Psi}'$ represents the region of the respective image $\Psi'$ warped in accordance with the motion $\hat{m}$.

20. An ego-motion determination method as defined in claim 18 in which the search generation step includes the step of generating at least one value for the weighting function $\lambda_i$ in accordance with $$\lambda_i = \frac{P_1}{P_2},$$

where $$P_1 = \max\left(\exp\left(-\frac{S_i(\hat{m})}{\sigma^2}\right)\right)$$

for all $\hat{m} \in \hat{M}$ is the value for the best fit in a local search region, and $$P_2 = \max\left(\exp\left(-\frac{S_i(\hat{m})}{\sigma^2}\right)\right),$$

for all $\hat{m} \in L$ is the value for the best fit over all possible image motions.

21. An ego-motion determination method as defined in claim 18 in which the search generation step includes the step of generating at least one value for the weighting function $\alpha_i$ to reflect the degree to which projections of a line in the respective patch $W_i$, $W_i'$ is horizontal and parallel to the direction of the roadway or horizontal and perpendicular to the direction of the roadway, and not vertical.

22. An ego-motion determination method as defined in claim 21 in which the search generation step includes the step of generating at least one value for the weighting function $\alpha_i$ in relation to a gradient in luminance at respective points in the respective patch $W_i$, $W_i'$.

23. An ego-motion determination method as defined in claim 18 in which the search generation step includes the step of generating generate at least one value for the gradient strength function $\beta_i$ in accordance with $$\beta_i = \left( \sum_{\hat{m} \in L} \exp\left(-\frac{S_i(\hat{m})}{\sigma^2}\right) \right)^{-1} \quad (10)$$

where $S(\hat{m})$ represents the sum of squared difference between the patch $W_i$ and the corresponding patch $W_i'$ warped according to the motion $\hat{m}$, and $\sigma$ is a function of noise in the respective images.

24. An ego-motion determination method as defined in claim 23 in which the search generation step includes the step of generating the sum of squared difference $S(\hat{m})$ for the respective "i-th" patches in accordance with $$S(\hat{m}) = \frac{1}{N} \sum_{x,y \in R} \left( \hat{\Psi}'(x, y) - \Psi(x, y) \right)^2,$$

where "R" represents the region associated with the respective "i-th" patch, and $\hat{\Psi}'$ represents the region of the respective image $\Psi'$ warped in accordance with the motion $\hat{m}$.

25. A computer program product as defined in claim 24 in which the processor module is configured to enable the computer to generate the ego-motion estimate in relation to portions of the respective images $\Psi'$ and $\Psi$ that are likely to represent projections of the roadway.

26. A computer program product as defined in claim 25 in which the processor module comprises:

A. a patch generator module configured to enable the computer to divide respective images $\Psi'$ and $\Psi$ into a plurality of respective patches $W_i'$ and $W_i$;

B. a confidence value generator module configured to enable the computer to generate for respective patches $W_i'$ and $W_i$ at least one confidence value representative of the confidence that the respective patch represents a projection of the roadway;

C. a search generator module configured to enable the computer to perform a search operation to identify the motion $\hat{m}$ that has a selected relationship in connection with a probability density function in relation to motions for the respective patches and the at least one confidence value.

27. A computer program product as defined in claim 26 in which the search generator module is configured to enable the computer to perform the search operation to determine the motion $\hat{m}$ that maximizes the probability density function in relation to the respective patches.

28. A computer program product as defined in claim 27 in which the search generator module is configured to enable the computer to perform the search operation to determine the motion $\hat{m}$ that maximizes the probability density function defined by $$P(\hat{m} \mid \Psi, \Psi') = c \frac{\sum_i P(\hat{m} \mid W_i, W_i') \lambda_i \alpha_i \beta_i}{\sum_i \lambda_i},$$

where (i) $P(\hat{m} \mid W_i, W_i') = c e^{\frac{S(\hat{m})}{\sigma^2}}$ represents a probability density function relating the respective "i-th" patches $W_i$ and $W_i'$, where $S(\hat{m})$ represents the sum of squared difference between the patch $W_i$ and the corresponding patch $W_i'$ warped according to the motion $\hat{m}$, and $\sigma$ is a function of noise in the respective images, and "c" is a normalization factor;

(ii) $\lambda_i$ and $\alpha_i$ are weighting functions whose values reflect the confidence that the respective "i-th" patch is a projection of the roadway; and (iii) $\beta_i$ is a gradient strength function whose value reflects the degree to which the image in the respective "i-th" patch contains a texture.

29. A computer program product as defined in claim 28 in which the search generator module is configured to enable the computer to generate the sum of squared difference $S(\hat{m})$ for the respective "i-th" patches in accordance with $$S(\hat{m}) = \frac{1}{N} \sum_{x,y \in R} \left( \hat{\Psi}'(x, y) - \Psi(x, y) \right)^2,$$

where "R" represents the region associated with the respective "i-th" patch, and $\hat{\Psi}'$ represents the region of the respective image $\Psi'$ warped in accordance with the motion $\hat{m}$.

30. A computer program product as defined in claim 28 in which the search generator module is configured to generate at least one value for the weighting function $\lambda_i$ in accordance with $$\lambda_i = \frac{P_1}{P_2},$$

where $$P_1 = \max\left( \exp\left(-\frac{S_i(\hat{m})}{\sigma^2}\right) \right)$$

for all $\hat{m} \in \hat{M}$ is the value for the best fit in a local search region, and $$P_2 = \max\left( \exp\left(-\frac{S_i(\hat{m})}{\sigma^2}\right) \right),$$

for all $\hat{m} \in L$ is the value for the best fit over all possible image motions.

31. A computer program product as defined in claim 28 in which the search generator module is configured to enable the computer to generate at least one value for the weighting function $\alpha_i$ to reflect the degree to which projections of a line in the respective patch $W_i$, $W_i'$ is horizontal and parallel to the direction of the roadway or horizontal and perpendicular to the direction of the roadway, and not vertical.

32. A computer program product as defined in claim 31 in which the search generator module is configured to enable the computer to generate at least one value for the weighting function $\alpha_i$ in relation to a gradient in luminance at respective points in the respective patch $W_i$, $W_i'$.

33. A computer program product as defined in claim 28 in which the search generator module is configured to enable the computer to generate at least one value for the gradient strength function $\beta_i$ in accordance with $$\beta_i = \left( \sum_{\hat{m} \in L} \exp\left(-\frac{S_i(\hat{m})}{\sigma^2}\right) \right)^{-1} \quad (15)$$

where S($\hat{m}$) represents the sum of squared difference between the patch $W_i$ and the corresponding patch $W_1'$ warped according to the motion $\hat{m}$, and $\sigma$ is a function of noise in the respective images.

34. A computer program product as defined in claim 33 in which the search generator module is configured to enable the computer to generate the sum of squared difference S($\hat{m}$) for the respective "i-th" patches in accordance with $$S(\hat{m}) = \frac{1}{N} \sum_{x,y \in R} \left( \hat{\Psi}'(x, y) - \Psi(x, y) \right)^2,$$

where "R" represents the region associated with the respective "i-th" patch, and $\hat{\Psi}'$ represents the region of the respective image $\Psi'$ warped in accordance with the motion $\hat{m}$.

35. A computer program product for use in connection with a computer to provide an ego-motion determination system for generating an estimate as to the ego-motion of a vehicle moving along a roadway, the computer program product comprising a computer readable medium having encoded thereon:

A. an image receiver module configured to enable the computer to receive image information relating to a series of at least two images recorded as the vehicle moves along a roadway; and B. a processor module configured to enable the computer to process the image information received by the image receiver module to generate an ego-motion estimate of the vehicle relative to the roadway.

36. A computer program product as defined in claim 35 in which the processor module is configured to enable the computer to generate the ego-motion estimate in relation to the likelihood that at least one difference between an image $\Psi'$ and a previously-recorded image $\Psi$ was due to a motion $\hat{m}$ as between the two images.

* * * * *